United States Patent [19]

Green

[11] 4,389,448

[45] Jun. 21, 1983

[54] PATTERNED DRYER ADDED FABRIC CONDITIONING ARTICLES

[75] Inventor: Donald L. Green, Forest Lakes, N.J.

[73] Assignee: Beecham Products, Parsippany, N.J.

[21] Appl. No.: 396,458

[22] Filed: Jul. 8, 1982

Related U.S. Application Data

[63] Continuation of Ser. No. 208,950, Nov. 21, 1980, abandoned.

[51] Int. Cl.³ .................................................. B32B 3/00

[52] U.S. Cl. ...................................... 428/195; 252/8.6; 252/8.8; 252/90; 427/242; 428/423.1

[58] Field of Search ............... 428/195, 310, 311, 315, 428/423.1; 252/90, 91, 8.6, 8.8; 427/242

[56] References Cited

U.S. PATENT DOCUMENTS 3,118,060 1/1964 Klein .

FOREIGN PATENT DOCUMENTS 2007096 9/1977 United Kingdom .

*Primary Examiner*—James J. Bell

*Attorney, Agent, or Firm*—Jacobs & Jacobs

[57] ABSTRACT

An article useful for the conditioning of clothes in an automatic laundry dryer during the drying cycle is produced which comprises a flexible polyurethane foam substrate impregnated with an effective amount of a conditioning agent and which has on at least one surface thereof a pattern which is substantially totally removed from the substrate during the drying cycle thereby indicating to the consumer or user of the article that the conditioning agent has been substantially completely removed from the article during the course of the drying cycle.

44 Claims, No Drawings

PATTERNED DRYER ADDED FABRIC CONDITIONING ARTICLES

CROSS-REFERENCE

This is a continuation of Ser. No. 208,950 filed Nov. 21, 1980 now abandoned.

The present invention is concerned with an article useful for conditioning clothes in an automatic laundry dryer during the drying cycle which article has a pattern thereon which is substantially totally removed from the article during the course of the drying cycle thereby indicating to the user of the article that the conditioning agent which the article contained has been substantially completed used up during the course of the drying cycle.

Various dryer added fabric conditioning agents for use in automatic laundry dryers for the purpose of conditioning clothes such as to provide softness and/or antistatic properties thereto or bacteriostatic or fungicidal properties thereto are known in the art. Such articles comprise a fibrous, woven or nonwoven flexible substrate coated or impregnated with a suitable fabric conditioning agent or a flexible polyurethane foam substrate impregnated with a suitable fabric conditioning agent which will transfer from the substrate to the clothes to be conditioned during the drying cycle in an automatic laundry dryer. Frequently the use of such an article will attempt to reuse the article on a subsequent bundle of clothes and will be disappointed that the conditioning achieved from the first use is not repeated for the second use.

The present invention provides a decorative pattern on the substrate which is visible to the user at the time the substrate is initially placed in the automatic laundry dryer with the clothes to be conditioned and which pattern substantially totally disappears from the substrate during the course of the drying cycle. The disappearance of the pattern is intended to indicate to the user that the conditioning agent has been substantially totally used up and that the substrate therefore does not contain a sufficient amount of conditioning agent to render the article useful a second or subsequent time. More particularly, the present invention comprises an article useful for conditioning clothes in an automatic laundry dryer during the drying cycle which comprises a flexible polyurethane foam substrae impregnated with an effective amount of a conditioning agent and having on at least one surface thereof a pattern imprinted with an ink which adheres to the surface, is stable to the conditioning agent, is stable during the impregnation of the substrate with the conditioning agent or else is applied to the substrate after the substrate has been impregnated with a conditioning agent, which pattern substantially totally disappears from the substrate during this drying cycle. The conditioning agent may be a fabric softening agent, an antistatic agent, a fabric softening and antistatic agent, a bacteriostatic agent or a fungicide. The ink used to imprint the pattern on the substrate is preferably a titanium dioxide ($TiO_2$) water-based ink containing a suitable binder. The loading of dried ink is preferably from 0.05 to 60 g/m$^2$ within the patterned areas. When the conditioning agent is a fabric softening and antistatic agent one suitable class is cationic quaternary ammonium salts or cationic quaternary ammonium salt in combination with a suitable nonionic surfactant. Any quaternary ammonium salt or combination of quaternary ammonium salt and/or suitable nonionic surfactant which salt, mixture of salts or mixture is known in the art to exhibit fabric softening and antistatic effect and which is compatible for impregnation into a flexible polurethane foam substrate may be used.

Particularly useful cationic quaternary ammonium salts are:

dodecyltrimethyl ammonium chloride,
didodecyldimethyl ammonium chloride,
tetradecyltrimethyl ammonium chloride,
ditetradecyldimethyl ammonium chloride,
pentadecyltrimethyl ammonium chloride,
dipentadecyldimethyl ammonium chloride,
didodecyldiethyl ammonium chloride,
didodecyldipropyl ammonium chloride,
ditetradecyldiethyl ammonium chloride,
dietradecyldipropyl ammonium chloride,
ditallowdiethyl ammonium chloride,
ditallowdipropy ammonium chloride,
tallowdimethyl benzyl ammonium chloride,
tallowdiethyl benzyl ammonium chloride,
dodecyltrimethyl ammonium methyl sulfate,
didodecyldiethyl ammonium acetate,
tallowtrimethyl ammonium acetate,
tallowdimethyl benzyl ammonium nitrite,
ditallowdipropyl ammonium phosphate,
tallowtrimethyl ammonium chloride,
tallowdimethyl (3-tallowalkoxpropyl) ammonium chloride,
ditallow dimethyl ammonium chloride,
ditallow dimethyl ammonium methyl sulfate,
eicosyltrimethyl ammonium chloride,
dieicosyldimethyl ammonium chloride,
methyl-l-coco amido ethyl-2-coco imidazolinium methyl sulfate,
methyl-l-soya amido ethyl-2-soya imidazolinium methyl sulfate,
methyl-l-tallow amido ethyl-2-tallow imidazolinium methyl sulfate,
methyl-l-oleyl amido ethyl-2-oleyl imidazolinium methyl sulfate,
methyl-l-tallow amido ethyl-2-tallow imidazolinium chloride.

Particularly suitable zwitterionic quaternary ammonium compounds are:

3-(N-eicosyl-N,N-dimethylammonio)-2-hydroxypropane-1-sulfonate,
3-(N-eicosyl-N,N-dimethylammonio)propane-1-sulfonate,
3-(N-eicosyl-N,N-di(2-hydroxyethyl)ammonio)-2-hydroxypropane-1-sulfonate,
3-(N-docosyl-N,N-dimethylammonio)-2- hydroxypropane-1-sulfonate,
3-(N-docosyl-N,N-dimethylammonio)-propane-1-sulfonate,
3-(N-docosyl-N,N-bis-(2-hydroxyethyl)ammonio)-2-hydroxypropane-1-sulfonate,
3-(N-tetrocsyl-N,N-dimethylammonio)-2-hydroxypropane-1-sulfonate,
3-(N-tetracosyl-N,N-dimethylammonio)-propane-1-sulfonate,
3-(N-tetracosyl-N,N-bis(2-hydroxethyl)ammonio)-2-hydroxypropane-1-sulfonate,
3-(N-hexacosyl-N,N-dimethylammonio)-2-hydroxypropane-1-sulfonate,
3-(N-hexacosyl-N,N-dimethylammonio)-propane-1-sulfonate, 3-(N-eicosyl-N-ethyl-N-methylammonio)-2-hydroxypropane-1-sulfonate,
3-(N-docosyl-N-ethyl-N-methylammonio)-2-hydroxpropane-1-sulfonate,
3-(N-tetracosyl-N-ethyl-N-methylammonio)-2-hydroxypropane-1-sulfonate,
3-(N-heneicosyl-N,N-dimethylammonio)-2-hydroxypropane-1-sulfonate,
3-(N-tricosyl-N,N-dimethylammonio)-2-hydroxypropane-1-sulfonate,
3-(N-tricosyl-N-ethyl-N-methylammonio)-2-hydroxypropane-1-sulfonate,
3-(N-tricosyl-N,N-dimethylammonio)-propane-1-sulfonate,
3-(N-pentacosyl-N,N-dimetnylammonio)-2-hydroxypropane-1-sulfonate,
3-(N-(2-methoxydocosyl)-N,N-dimethylammonio)-2-hydroxypropane-1-sulfonate,
3-(N-heptacosyl-N,N-dimethylammonio)-propane-1-sulfonate,
3-(N-octacosyl-N,N-dimethylammonio)-2-hydroxypropane-1-sulfonate,
3-(N-nonacosyl-N,N-dimethylammonio)-2-hydroxypropane-1-sulfonate,
3-(N-triacontyl-N,N-dimethylammonio)-propane-1-sulfonate,
3-(N-(3,5-dioxatetracosyl)-N,N-dimethylammonio)-2-hydroxypropane-1-sulfonate.

Suitable anionic sulfonates include:
sodium or potassium 2-acetoxydocosylsulfonate,
ammonium 2-acetoxydocosylsulfonate,
diethanolammonium 2-acetoxydocosylsulfonate,
sodium or potassium 2-acetoxytricosylsulfonate,
sodium or potassium 2-acetoxytetracosylsulfonate,
sodium or potassium 2-acetoxypentacosyl sulfonate,
sodium or potassium 2-acetoxyhexacosylsulfonate,
sodium or potassium 2-acetoxyheptacosylsulfonate,
sodium or potassium 2-acetoxyoctacosylsulfonate,
2-acetoxynonacostylsulfonate,
2-acetoxytriacontylsulfonate,
2-acetoxyheneitriacontylsulfonate,
2-acetoxydotriacontylsulfonate.

Particularly suitable softening nonionics include:
β-hydroxydocosyldimethylphosphine oxide,
heneicosylimethylethylphosphine oxide,
docosylmethylethylphosphine oxide,
tricosyldiethylphosphine oxide,
tricosyldimethylphosphine oxide,
tetracosyldi(2-hydroxyethyl)phosphine oxide,
pentacosyldimethylphosphine oxide,
eicosylmethyl-2-hydroxybutylphosphine oxide,
eicosyldibutylphosphine oxide,
docosylmethyl-3-hydroxylbutylphosphine oxide,
hexacosyldiethylphosphine oxide,
heptacosyldimethylphosphine oxide,
octacosyldiethylphosphine oxide,
triacontyldimethylphosphine oxide,
eicosyldimethylphosphine oxide,
eicosyldi(2-hydroxyethyl)phosphine oxide,
docosyldimethylphosphine oxide,
docosyldi(2-hydroxyethyl)phosphine oxide,
tetracosyldimethylphosphine oxide,
hexacosyldimethylphosphine oxide,
eicosyldiethylphosphine oxide,
docosyldiethylphosphine oxide,
tetracosyldi(2-hydroxyethyl)phosphine oxide,
eicosylmethylethylphosphine oxide,
heneicosyldimethylphosphine oxide,
β-hydroxyeicosyldimethylphosphine oxide,
eicosyl-bis(β-hydroxyethyl)amine oxide,
eicosyldimethylamine oxide,
docosyldimethylamine oxide,
docosyl-bis-(β-hydroxyethyl)amine oxide,
tetracosyldimethylamine oxide,
tetracosyl-bis-(β-hydroxyethyl)amine oxide,
hexacosyldimethylamine oxide,
hexacosyl-bis-(β-hydroxyethyl)amine oxide,
2-hydroxyeicosyldimethylamine oxide,
eicosylmethylethylamine oxide,
eicosyldiethylamine oxide,
2-hydroxyeicosyldiethylamine oxide,
heneicosyldimethylamine oxide,
heneicosyldiethylamine oxide,
docosyldiethylamine oxide,
tricosylidimethylamine oxide,
tricosyldiethylamine oxide,
tetracosyldiethylamine oxide,
β-hydroxytetracosyldimethylamine oxide,
pentacosyldimethylamine oxide,
hexacosyldiethylamine oxide,
eicosylmethyl(2-hydroxypropyl)amine oxide,
docosylbutylmethylamine oxide,
2-docosenyldimethylamine oxide,
2-methoxydocosyldimethylamine oxide,
hepacosyldimethylamine oxide,
octacosylmethylethylamine oxide,
octacosyldiethylamine oxide,
nonacosyldimethylamine oxide,
triacontyldiethylamine oxide,
3,6-dioxaoctacosyldimethylamine oxide,
2-hydroxy-4-oxatetracosyldimethylamine oxide,
6-stearamidohexyldimethylamine oxide,
glycerol-1-monolaurate,
glycerol-1-monomyristate,
glycerol-1-monopalmitate,
glycerol-1-monostearate,
glycerol-1-monobehenate,
glycerol-1-monlignicerate,
glycerol-1-monarachidoate,
glycerol-1,3-dipalmitate,
glycerol-1,3-distearate,
glycerol-1-palmitate-3-laurate,
glycerol-1-palmitate-3-stearate,
glycerol-1,3-dibehenate,
trilaurin,
trimyristin,
triolein,
tristearin,
-palmitodistearin,
β-stearopalmitolein,
β-palmitodistearin,
sobitan fatty acid esters (mentioned in U.S. Pat. No. 4,022,938, Zaki, et. al., May 10, 1977).

In addition to the above mentioned nonionics which function as the main or auxiliary softeners in the present invention, there is a second class of nonionics which are also useful as melting point depressants and transfer facilitators to the previously mentioned softening compounds (quaternary ammonium salts, anionic, and nonionic). Particularly suitable classes of these compounds include the following:

polyoxyethylene fatty acid esters
polyoxypropylene fatty acid esters
polyoxyethylene fatty alcohol ethers When the conditioning agent is a quaternary ammonium salt said salt will have at least one of the properties of softening fabrics and conveying antistatic properties thereto.

The present invention also includes a method of conditioning clothes in an automatic laundry dryer during the drying cycle which comprises placing in the dryer together with the clothes to be conditioned, a flexible polyurethane foam substrate impregnated with an effective amount of a fabric conditioning agent and having on at least one surface thereof a pattern imprinted with an ink which adheres to the surface, is stable to the conditioning agent, is stable during the impregnation of the substrate or else is applied to the substrate after the substrate has been impregnated with a conditioning agent and which pattern substantially totally disappears from the substrate during the drying cycle. According to the above described method, the fabric conditioning agent is a fabric softening agent, an antistatic agent, a fabric softening and antistatic agent, a bacteriostatic agent or fungicide. The ink used to imprint the pattern and the loading is as described above. When the conditioning agent is a fabric softener and antistatic agent, it is preferably a cationic quaternary ammonium salt or a cationic quaternary ammonium salt in combination with a suitable nonionic surfactant. When the conditioning agent is a quaternary ammonium salt said salt will have at least one of the properties of softening fabrics and conveying antistatic properties thereto. Suitable quaternary ammonium salts and nonionic surfactants are described above.

A further aspect of the present invention comprises a method for producing the article described above which comprises imprinting a desired pattern on a flexible polyurethane foam substrate either prior to impregnation of the polyurethane foam substrate with the conditioning agent or subsequent to said impregnation. The ink used to imprint the pattern must be one which adheres to the substrate, is stable to the conditioning agent and if the pattern is applied prior to the impregnation step, the ink must be stable during the impregnation step and the ink must be such that the pattern substantially totally disappears from the substrate during the drying cycle. The fabric conditioning agent with which the polyurethane foam substrate is impregnated may be a fabric softening agent, an antistatic agent, a fabric softening and antistatic agent, a bacteriostatic agent or a fungicide. Any ink which meets the above set forth criteria is suitably and a titanium dioxide water-based ink containing a suitable binder has been found to be particularly useful. The loading of dried ink within the patterned area is preferably for 0.05 to 60 g/m$^2$ of finished product.

When the conditioning agent is a fabric softener and antistatic agent, it is preferably a quaternary ammonium salt, a mixture of such slats or a quaternary ammonium salt in combination with a suitable nonionic surfactant. When the fabric conditioning agent with which the substrate is impregnated is a quaternary ammonium salt or mixture of such salts, said compounds will have at least one of the properties of softening fabrics and conveying antistatic properties thereto.

Suitable quaternary ammonium salts and nonionic surfactants have been described above.

The flexible polyurethane foam substrate which is preferred for use according to the present invention preferably has a thickness of approximately 0.085 inches and a density of approximately 0.51 lbs/ft$^3$. It is preferably an open-celled polyurethane foam and particularly preferably the pore-size is about 70 pores per square inch. If desired, the substrate may be colored to provide a contrast to the ink which is used to form the pattern.

While with what is described above any ink system which meets the above set forth criteria may be used, one particularly acceptable ink system is Aqualox II, white, which is an ink system of Inmont Corporation. This ink consists of 35% $TiO_2$ in a water-base with an acrylic binder. Many inks contain binders or pigments which are readily dissolved into the active system of the substrate of dryer-added fabric softeners in conditioning agents and thus react with the substrate. This would result in problems during the impregnation of the substrate with the conditioning agent and would also be likely to cause staining of the clothes during the conditioning step in the dryer. Although the pattern substantially completely disappears from the substrate during the course of the drying cycle, the unique partial solvation of the binder by the active system both permits the transfer of conditioning agent and inhibits staining of the clothes.

The desired pattern may be imprinted under the flexible substrate by using any standard flexographic printing press. The flexographic printing press utilizes a rotary flexible rubber plate in conjunction with a rapidly drying ink. While the preferred loading of dried ink within the patterned area as has been described above as being within the range of 0.05 to 60 g/m$^2$, the preferred loading range is in the range of 0.05 to 4.2 g/m$^2$.

The following non-limitative example more particularly illustrates the present invention.

EXAMPLE

Aqualox II, white, a $TiO_2$ water-based ink available commercially from Inmont Corp. Lodi, N.J. was used to print a roll of blue polyurethane foam. The open-celled polyurethane foam had a thickness of 0.085 in., a density of 1.5 lbs/ft$^3$, and a pore size of 70 pores per square inch. A flexographic printing unit, Model 45-6, manufactured by Wolverine Flexographic Presses, Farmington, Mich. was used along with a 55 durometer synthetic rubber printing plate. The plate's raised printing surface consisted of 25% of the total surface area and individual designes were 0.23 in$^2$ in area. The average dry ink loading onto the foam was 3.2 g/m$^2$ within the printed areas, or approximately 0.8 g/m$^2$ over the total surface of the foam.

The printed foam was then impregnated with a 62.5/37.5 mixture of dimethyl di-(hydrogenated-tallow-)ammonium methylsulfate/polyethoxylated glycol ester in a liquid state at 180° F. The impregnation process is accomplished via a pair of compression rollers neither of which showed any visible evidence of ink solids either during or after the run.

The finished printed and impregnated foam was then cut into 3×7 in. sheets and evaluated in a standard residential clothes dryer. After a normal 50 minute drying cycle the pattern had substantially disappeared leaving no trace of any visible residue on dark synthetic items used in the testing bundle.

What is claimed is

1. An article useful for conditioning clothes in an automatic laundry dryer during the drying cycle, which article comprises a flexible polyurethane foam substrate impregnated with an effective amount of a conditioning agent and having on at least one surface thereof a pattern imprinted with an ink which adheres to the substrate, said ink being stable to the conditioning agent and stable during the impregnation of the substrate with the conditioning agent, or the ink is applied to the substrate after it has been impregnated, the ink pattern substantially disappearing from the substrate during the drying cycle.

2. An article according to claim 1 wherein the conditioning agent is a fabric softening agent.

3. An article according to claim 1 wherein the conditioning agent is a antistatic agent.

4. An article according to claim 1 wherein the conditioning agent is a fabric softening and antistatic agent.

5. An article according to claim 1 wherein the conditioning agent is a bacteriostatic agent.

6. An article according to claim 1 wherein the conditioning agent is fungicide.

7. An article according to claim 1 wherein the ink is a $TiO_2$ water-based ink containing a suitable binder.

8. An article according to claim 1 wherein the loading of dried ink is from 0.05 to 60 g/m$^2$ within the patterned areas.

9. An article according to claim 4 wherein the fabric softener and antistatic agent is a quaternary ammonium salt alone or in combination with a suitable nonionic surfactant.

10. An article according to claim 1 wherein the conditioning agent is a cationic fabric softener and antistatic agent.

11. An article according to claim 1 wherein the conditioning agent is a quaternary ammonium salt which has at least one of the properties of softening fabrics and conveying antistatic properties thereto.

12. A method of conditioning clothes in an automatic laundry dryer during the drying cycle which method comprises placing in the dryer together with the clothes to be conditioned, a flexible polyurethane foam substrate impregnated with an effective amount of a fabric conditioning agent and having on at least one surface thereof a pattern imprinted with an ink which adheres to the substrate, said ink being stable to the conditioning agent, and stable during the impregnation of the substrate with the conditioning agent, or the ink is applied to the substrate after it has been impregnated, the ink pattern substantially disappearing from the substrate during the drying cycle.

13. A method according to claim 12 wherein the conditioning agent is a fabric softening agent.

14. A method according to claim 12 wherein the conditioning agent is a antistatic agent.

15. A method according to claim 12 wherein the conditioning agent is a fabric softening and antistatic agent.

16. A method according to claim 12 wherein the conditioning agent is a bacteriostatic agent.

17. A method according to claim 12 wherein the conditioning agent is fungicide.

18. a method according to claim 12 wherein the ink is a $TiO_2$ water-based ink containing a suitable binder.

19. A method according to claim 12 wherein the loading of dried ink is from 0.05 to 60 g/m$^2$ within the patterned areas.

20. A method according to claim 15 wherein the fabric softener and antistatic agent is a quaternary ammonium salt alone or in combination with a suitable nonionic surfactant.

21. A method according to claim 12 wherein the conditioning agent is a cationic fabric softener and antistatic agent.

22. A method according to claim 12 wherein the conditioning agent is a quaternary ammonium salt which has at least one of the properties of softeneing fabrics and conveying antistatic properties thereto.

23. A method of producing an article useful for conditioning clothes in an automatic laundry dryer during the drying cycle which comprises imprinting a desired pattern on a flexible polyurethane foam substrate with an ink which adheres to the substrate, said ink being stable to the conditioning agent, and stable during the impregnation of the substrate with the conditioning agent, the ink pattern substantially disappearing from the substrate during the drying cycle and thereafter impregnating the substrate with an effective amount of the fabric conditioning agent.

24. A method according to claim 23 wherein the conditioning agent is a fabric softening agent.

25. A method according to claim 23 wherein the conditioning agent is a antistatic agent.

26. A method according to claim 23 wherein the conditioning agent is a fabric softening and antistatic agent.

27. A method according to claim 23 wherein the conditioning agent is a bacteriostatic agent.

28. A method according to claim 23 wherein the conditioning agent is fungicide.

29. A method according to claim 23 wherein the ink is a $TiO_2$ water-based ink containing a suitable binder.

30. A method according to claim 23 wherein the loading of dried ink is from 0.05 to 60 g/m$^2$ within the patterned areas.

31. A method according to claim 26 wherein the fabric softener and antistatic agent is a quaternary ammonium salt alone or in combination with a suitable nonionic surfactant.

32. A method according to claim 24 wherein the conditioning agent is a cationic fabric softener and antistatic agent.

33. A method according to claim 23 wherein the conditioning agent is a quaternary ammonium salt which has at least one of the properties of softening fabrics and conveying antistatic properties thereto.

34. A method of producing an article useful for conditioning clothes in an automatic laundry dryer during the drying cycle which comprises impregnating a polyurethane foam substrate with an effective amount of a fabric conditioning agent and thereafter imprinting thereon a pattern of a desired type or form with an ink which adheres to the substrate, is stable to the conditioning agent and substantially totally disappears from the substrate during the drying cycle.

35. A method according to claim 34 wherein the conditioning agent is a fabric softening agent.

36. A method according to claim 34 wherein the conditioning agent is a antistatic agent.

37. A method according to claim 34 wherein the conditioning agent is a fabric softening and antistatic agent.

38. A method according to claim 34 wherein the conditioning agent is a bacteriostatic agent.

39. A method according to claim 34 wherein the conditioning agent is fungicide.

40. A method according to claim 34 wherein the ink is a $TiO_2$ water-based ink containing a suitable binder.

41. A method according to claim 34 wherein the loading of dried ink is from 0.05 to 60 g/m$^2$ within the patterned areas.

42. A method according to claim 37 wherein the fabric softener and antistatic agent is a quaternary ammonium salt or in combination with a suitable nonionic surfactant.

43. A method according to claim 34 wherein the conditioning agent is a cationic fabric softener and anti-static agent.

44. A method according to claim 34 wherein the conditioning agent is a quaternary ammonium salt which has at least one of the properties of softening fabrics and conveying antistatic properties thereto.

* * * * *